(12) United States Patent
Chen

(10) Patent No.: US 8,681,296 B2
(45) Date of Patent: Mar. 25, 2014

(54) LCD PANEL MANUFACTURING METHOD, LCD PANEL, AND LCD

(75) Inventor: Chenghung Chen, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 207 days.

(21) Appl. No.: 13/378,760

(22) PCT Filed: Dec. 7, 2011

(86) PCT No.: PCT/CN2011/083605
§ 371 (c)(1),
(2), (4) Date: Dec. 16, 2011

(87) PCT Pub. No.: WO2013/078720
PCT Pub. Date: Jun. 6, 2013

(65) Prior Publication Data
US 2013/0141683 A1    Jun. 6, 2013

(30) Foreign Application Priority Data
Dec. 2, 2011   (CN) .......................... 2011 1 0396335 6

(51) Int. Cl.
*G02F 1/1337* (2006.01)
(52) U.S. Cl.
USPC ........... 349/123; 349/125; 349/149; 349/150; 349/151; 349/152
(58) Field of Classification Search
USPC ................................. 349/123, 125, 149–152
See application file for complete search history.

(56) References Cited

U.S. PATENT DOCUMENTS

| 6,999,148 | B2 * | 2/2006 | Lee | 349/124 |
| 2008/0143902 | A1 * | 6/2008 | Ku | 349/38 |

FOREIGN PATENT DOCUMENTS

| CN | 1301976 A | 7/2001 |
| CN | 1658050 A | 8/2005 |
| CN | 1841168 A | 10/2006 |
| JP | 60154234 A | 8/1985 |
| JP | 8271915 A | 10/1996 |

OTHER PUBLICATIONS

Duan Keyu, the International Searching Authority written comments, Sep. 2012, CN.

* cited by examiner

*Primary Examiner* — Phu Vu
(74) *Attorney, Agent, or Firm* — IPro, Inc.; Na Xu

(57) ABSTRACT

The invention discloses a liquid crystal display (LCD) panel manufacturing method as well as an LCD panel and an LCD. The manufacturing method comprises the following steps: A: Treating a surface of an electrode of an LCD panel, the surface at least comprising a contact surface with an Au ball, to diminish the adhesion of an alignment liquid to the contact surface and prevent the alignment liquid from not coating the contact surface; and B: Coating or printing the alignment liquid. Because the electrode surface to which an Au ball particle will be applied (namely the transfer pad) is treated before the application to diminish the adhesion of the alignment liquid to this surface, and no alignment layer will be formed on the surface of the transfer pad. Therefore, the alignment layer can be very wide, the uniformity of the alignment layer at the edge is good, the accuracy is high, the display effect on the edge of the LCD panel is improved, and the frame of the LCD panel is narrowed.

17 Claims, 2 Drawing Sheets

LCD PANEL MANUFACTURING METHOD, LCD PANEL, AND LCD

TECHNICAL FIELD

The invention relates to the field of liquid crystal displays, and more particularly to a liquid crystal display (LCD) panel manufacturing method, an LCD panel, and an LCD.

BACKGROUND

A liquid crystal display panel is a main component of a liquid crystal display device, including an array substrate, a color filter substrate, and liquid crystal sealed between the array substrate and the color filter substrate. The liquid crystal is applied to the alignment layer so as to be arranged in a specified direction.

FIG. 2 shows a partial cross section of the edge of existing conventional LCD panel. The LCD panel includes an array substrate and a color filter substrate. The color filter substrate includes a top plate 10, and a top electrode 30 is arranged on the top plate 10. The array substrate includes a bottom plate 20, and a bottom electrode 40 is arranged on the bottom plate 20. Alignment layers 50 are respectively coated on the top plate 10 and the bottom plate 20. In FIG. 1, the line from A to A' represents the active edge 101 of the active area; the line from B to B' represents the alignment edge 51 of the alignment layer 50. Considering the application accuracy of the alignment layers 50 and nonuniform thickness at edges of the alignment layers 50, a space X must be left between the active edge 101 and the alignment edge 51; otherwise, poor liquid crystal alignment or mura may occur at the edge of the active area.

In FIG. 1, Y represents the application range of a sealant 60, namely the sealant area. The sealant 60 contains spacers for supporting the cell gap. Z represents a space in which an Au ball 70 can be applied, namely a transfer pad. Generally, in a common vertical alignment or twist nematic display mode, the top plate 10 is provided with the transparent top electrode 30. In fact, however, printed circuit board (PCB) or IC is bonded to the bottom plate 20. Thus, signals of the bottom electrode 40 must be transmitted to the top electrode 30 of the top plate via the Au ball 70.

In general, the resistance of the alignment layer is very high, so when the top electrode or the bottom electrode in the transfer pad is covered by the alignment layer, the Au ball can not effectively transmit signals of the bottom electrode to the top electrode, and the display of the LCD panel will be abnormal. Therefore, as shown in FIG. 1, to ensure that the Au ball 70 in the transfer pad Z can operate effectively, the edge of the alignment layer 50 must be separated from the transfer pad Z, and a wide frame is usually left at the edge of the plate (the frame represents the width of the inactive area of the plate) to prevent the alignment layer 50 from covering the transfer pad Z, resulting in that the top electrode and the bottom electrode cannot be conducted through the Au ball 70.

SUMMARY

The aim of the invention is to provide a method for manufacturing LCD panels with narrow frames.

The purpose of the invention is achieved by the following technical schemes: an LCD panel manufacturing method comprises the following steps:

A: Treating a surface of an electrode of an LCD panel, the surface at least comprising a contact surface with an Au ball, to diminish the adhesion of an alignment liquid to the contact surface and prevent the alignment liquid from not coating the contact surface; and B: Coating or printing the alignment liquid.

Preferably, in step B, the coating or printing border of the alignment liquid is at least within or out of the border of the sealant area of an LCD panel. Thus the thickness at the edge of a formed alignment layer is uniform, liquid crystal molecules at the edge can be better aligned, the border of the active area is closer to the sealant area, the range of the active area is extended, and the range of the frame is narrowed.

Preferably, in step B, an Au ball transfer pad is arranged in the sealant area. When the alignment liquid is coated or printed, the coating or printing border of the alignment liquid is out of the transfer pad. Thus, the thickness of an alignment layer at the edge of the active area is uniform, the border of the active area is closer to the sealant zone, the range of the active area is extended, and the range of the frame is narrowed.

Preferably, in step A, the treatment on the contact surface between the Au ball and the electrode in the transfer pad means the application of a lipophilic film on the contact surface. The application of the lipophilic film is convenient, quick, and easy.

Preferably, in step A, the treatment on the contact surface between the Au ball and the electrode in the transfer pad means the polishing treatment of the contact surface so as to diminish the adhesion of the alignment liquid to the transfer pad surface. The polishing treatment is simple, and no additional material is needed.

Preferably, in step A, the treatment is conducted in the whole transfer pad. Thus, there is not any alignment layer on the surface of the transfer pad, and the contact between the Au ball and the electrode is guaranteed.

An LCD panel, comprises oppositely arranged a top plate and a bottom plate, wherein the top plate is provided with a top electrode, the bottom plate is provided with a bottom electrode, the top electrode and the bottom electrode are respectively provided with a transfer pad in the edge area for containing an Au ball, inner surfaces of the top plate and the bottom plate are respectively provided with an alignment layer, and the inner surface of each transfer pad is provided with a treatment layer without an attached alignment layer.

Preferably, the treatment layer is a lipophilic film. The application of the lipophilic film is convenient, quick, and easy.

Preferably, the treatment layer is a polished layer obtained by polishing the inner surface of the transfer pad. The polishing treatment is simple, and no additional material is needed.

Preferably, the border of the alignment layer is within or out of the border of the sealant area of the LCD panel. Thus, the border of the active area is closer to the sealant area, the range of the active area is extended, and the range of the frame is narrowed.

Preferably, the transfer pad is within the sealant area, and the border of the alignment layer is out of the border of the transfer pad. Thus, the edge of the alignment layer is good.

Preferably, the border of the alignment layer is out of the border of the sealant area. Thus the edge of the alignment layer is good and convenient to process with no need for high accuracy.

Preferably, the whole top surface of the electrode within the transfer pad is a treatment layer without an attached alignment layer. Therefore, the contact between the Au ball and the electrode as well as reliable communications can be guaranteed.

An LCD comprises the liquid crystal panel.

In the LCD panel manufacturing method of the invention, prior to the coating or printing of the alignment layer to the LCD panel, the electrode surfaces to be applied with the Au ball particle of the top plate and bottom plate (namely the transfer pad) are coated with lipophilic films or are treated so as to diminish the adhesion of the alignment liquid to those areas, and therefore, the application range of the alignment liquid is extended to the transfer pad of the sealant area, the alignment liquid is prevented from draping over the surfaces, and no alignment layer will be formed on the transfer pad surface during the curing. The alignment layer is wider than that of the prior art, namely that a space between the border of the alignment layer and the sealant area or the transfer pad is not needed; even if the alignment liquid is applied to the transfer pad, no alignment layer will be formed on the electrode surface within the transfer pad; thus the active area is extended towards the sealant, the uniformity of the alignment layer near the sealant is good, the accuracy is high, the display effect of LCD panel near the sealant area is improved, and the border of the active area is extended towards the sealant.

Wherein: 10, top plate; 20, bottom plate; 30, top electrode; 40, bottom electrode; 41, treatment layer; 50, alignment layer; 51, alignment border; 60, sealant; 61 sealant border; 67, transfer pad border; 70, Au ball; 90, bonding area; 101 active border.

DETAILED DESCRIPTION

The invention is further described by figures and the preferred embodiments as follows.

The invention provides a liquid crystal display (LCD) panel manufacturing method as well as LCD panels and LCDs manufactured by using the method. The manufacturing method comprises the following steps: A. Conducting surface treatment on a transfer pad within a sealant area of an electrode surface, the surface at least comprising a contact surface with an Au ball, to diminish the adhesion of an alignment liquid to the contact surface and prevent the alignment liquid from not coating the contact surface, the contact surface being a surface of the transfer pad of the electrode; B. Coating or printing the alignment liquid. The LCD panel comprises a top plate and a bottom plate, wherein a sealant area is respectively arranged at edges of the top plate and the bottom plate, electrode layers are arranged on surfaces of the top plate and the bottom plate, and each electrode layer is provided with an alignment layer; the border of the alignment layer is within or out of the border of the sealant area.

Figure 1:
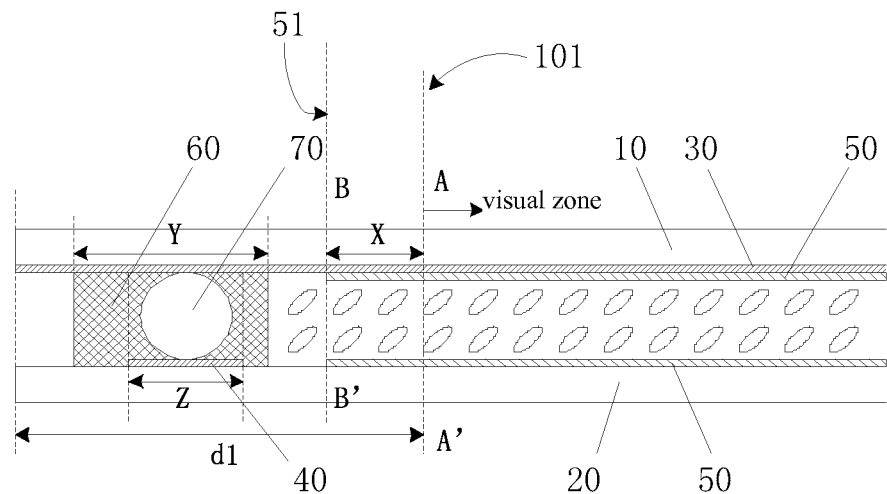
FIG. 1 shows a structure of the existing LCD panel.
Figure 2:
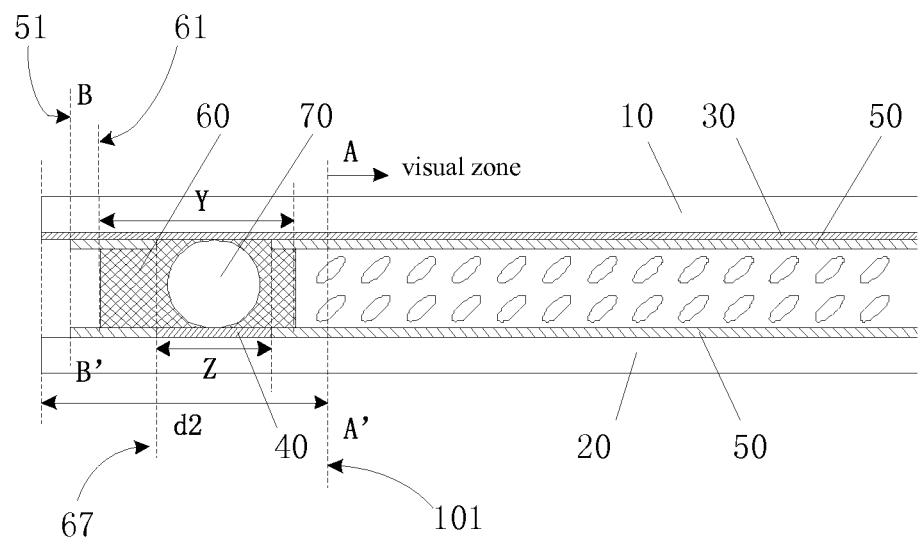
FIG. 2 shows a structural profile of an LCD panel of one embodiment of the invention.

An embodiment of the invention is shown in FIG. 2. The LCD panel comprises a top plate 10, a bottom plate 20, and liquid crystal sealed between the top plate 10 and the bottom plate 20. A top electrode 30 is arranged on the surface of the top plate 10. The top electrode 30 is provided with an alignment layer 50, and the bottom plate 20 is also provided with a bottom electrode 40 and an alignment layer 50. A sealant 60 is arranged between the top plate 10 and the bottom plate 20 at the edge of the LCD panel. Y in the figure represents the sealant area. A transfer pad Z is arranged on the sealant area Y, and an Au ball 70 is arranged in the transfer pad Z to transmit signals of the bottom electrode 40 to the top electrode 30. The alignment border 51 of the alignment layer 50 is out of the sealant border 61 of the sealant area Y, an alignment layer is not formed on the electrode surface of transfer pad Z, and therefore, the Au ball 70 can transmit the signals of bottom electrode 40 to the top electrode 30. The alignment border 51 of the alignment layer 50 is out of the sealant border 61 of the sealant area Y, and therefore, the active border 101 of the active area is extended towards the border of the LCD panel, the range of the active area is extended, and the width of the border of the LCD panel is reduced. As shown in FIG. 1, the distance between the active border 101 and the border of LCD panel is d1 in the existing LCD panel; as shown in FIG. 2, the distance between the active border 101 and the border of LCD panel is d2 in this embodiment. By comparison, d1>d2, d1 and d2 are respectively the width of the border of the LCD panel, i.e. the frame of the LCD panel of this embodiment is narrower than that of the existing LCD panel.

Figure 3:
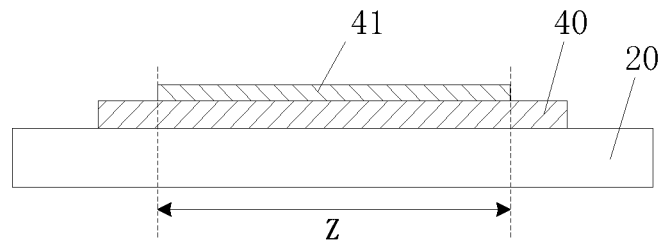
FIG. 3 shows a surface treatment technology of one embodiment of the invention.

In this embodiment, during the manufacturing of the LCD panel, surface treatment of the transfer pad Z is conducted, and therefore, a treatment layer is formed on the surface of the transfer pad Z. Thus, alignment layers will not be formed on the electrode surface during coating and printing of the alignment layer. As shown in FIG. 3, take the bottom plate 20 of this embodiment for example, the surface of the bottom electrode 40 in the transfer pad Z is treated to form a treatment layer 41, namely that a lipophilic film is applied to the surface of the electrode 40 so as to diminish the adhesion of the alignment liquid to the surface of the bottom electrode 40 to prevent the alignment liquid from coating the surface of the bottom electrode 40, and an alignment layer will not be formed on the electrode surface within the transfer pad Z. The top plate is processed in the same way as the bottom plate, i.e. a lipophilic film is applied to corresponding electrode surface of the transfer pad Z, and then the alignment liquid is printed or coated.

Optionally, the electrode surface of the transfer pad Z can be treated by polishing so as to reduce the adhesion of the alignment liquid to the surface.

Figure 4:
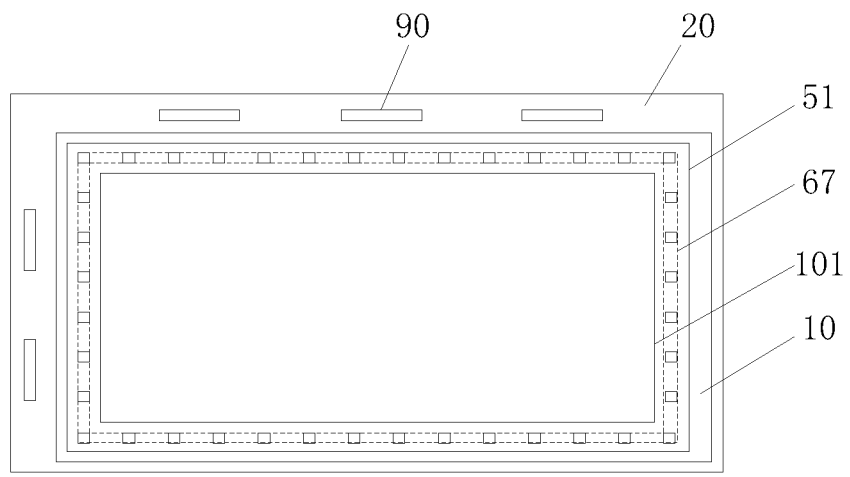
FIG. 4 shows a structure of an LCD panel of one embodiment of the invention.

In the embodiment, the surface treatment of the transfer pad Z is to ensure the electrode surface is not covered by the alignment layer so as not to affect the conduction of the Au ball. The Au ball does not contact with the surface of the whole transfer pad Z, so that only the surface in contact with the Au ball needs treating to diminish the adhesion of the alignment liquid to the contact surface so as to prevent the alignment liquid from coating the contact surface. The contact surface refers to the surface of the electrode transfer pad Z. When the alignment liquid is coated or printed, the coating or printing border of alignment liquid is at least within or out of the border of the sealant area of the LCD panel. Preferably, the coating or printing range of the alignment liquid covers the electrode surface of the transfer pad Z, i.e. the border of the alignment liquid is out of the border of the transfer pad Z so that the alignment liquid forms a uniform alignment layer in the place near the sealant area to ensure that the display effect in the place is the same as that of the inside of the LCD panel. As shown in FIG. 4, the alignment border 51 of the alignment layer is out of the border 67 of the transfer pad, and the visual border 101 is near the sealant area; in addition, when the alignment liquid is coated or printed, to avoid the use of the bonding area 90, the border of the alignment liquid cannot be expanded to the bonding area 90.

The above content is detailed description of the invention by using specific preferred embodiments. However, this invention is not limited to these specific embodiments. For the ordinary technical personnel in the technical field of the invention, on the premise of keeping the conception of the invention, the technical personnel can also make simple deductions or replacements, and all of which should be considered to belong to the protection scope of the invention.

We claim:

1. A liquid crystal display (LCD) panel manufacturing method, comprising the following steps:
   A: Treating a surface of an electrode of an LCD panel, the surface at least comprising a contact surface with an Au ball, to diminish the adhesion of an alignment liquid to the contact surface and prevent the alignment liquid from not coating the contact surface, wherein the treatment on the contact surface between the Au ball and the electrode in the transfer pad means the application of a lipophilic film on the contact surface; and
   B: Coating or printing the alignment liquid.

2. The LCD panel manufacturing method of claim 1, wherein in step B, a coating or printing border of the alignment liquid is at least within or out of a border of a sealant area of said LCD panel.

3. The LCD panel manufacturing method of claim 2, wherein in step B, an Au ball transfer pad is arranged in said sealant area, and when the alignment liquid is coated or printed, the coating or printing border of the alignment liquid is out of said transfer pad.

4. The LCD panel manufacturing method of claim 1, wherein in step A, the treatment on the contact surface between the Au ball and the electrode in the transfer pad means the polishing treatment of the contact surface so as to diminish the adhesion of the alignment liquid to the transfer pad surface.

5. The LCD panel manufacturing method of claim 1, wherein in step A, the treatment is conducted in the whole transfer pad.

6. An LCD panel, comprises oppositely arranged a top plate and a bottom plate, wherein the top plate is provided with a top electrode, the bottom plate is provided with a bottom electrode, the top electrode and the bottom electrode are respectively provided with a transfer pad in the edge area for containing an Au ball, inner surfaces of the top plate and the bottom plate are respectively provided with an alignment layer, and the inner surface of each transfer pad is provided with a treatment layer without an attached alignment layer, wherein the treatment layer is a lipophilic film.

7. The LCD panel of claim 6, wherein the treatment layer is a polished layer obtained by polishing the inner surface of said transfer pad.

8. The LCD panel of claim 6, wherein the border of the alignment layer is within or out of the border of the sealant area of said LCD panel.

9. The LCD panel of claim 8, wherein said transfer pad is within said sealant area, and the border of said alignment layer is out of the border of said transfer pad.

10. The LCD panel of claim 8, wherein the border of the alignment layer is out of the border of said sealant area.

11. The LCD panel of claim 6, wherein the whole top surface of the electrode within the transfer pad is a treatment layer without an attached alignment layer.

12. A liquid crystal display (LCD) comprising an LCD panel, wherein the LCD panel comprises oppositely arranged top plate and bottom plate, the top plate is provided with a top electrode, the bottom plate is provided with a bottom electrode, the top electrode and the bottom electrode are respectively provided with a transfer pad in the edge area for containing the Au ball, inner surfaces of the top plate and the bottom plate are respectively provided with an alignment layer, and the inner surface of each transfer pad is provided with a treatment layer without an attached alignment layer, wherein the treatment layer is a lipophilic film.

13. The LCD of claim 12, wherein the treatment layer is a polished layer obtained by polishing the inner surface of said transfer pad.

14. The LCD of claim 12, wherein the border of said alignment layer is within or out of the border of the sealant area of said LCD panel.

15. The LCD of claim 14, wherein said transfer pad is within said sealant area, and the border of said alignment layer is out of the border of said transfer pad.

16. The LCD of claim 14, wherein the border of said alignment layer is out of the border of said sealant area.

17. The LCD of claim 12, wherein the whole top surface of the electrode within the transfer pad is a treatment layer without an attached alignment layer.

\* \* \* \* \*